UNITED STATES PATENT OFFICE.

ROBERT S. EDWARDS, OF BROOKLINE, MASSACHUSETTS.

PROCESS OF RECOVERING SALTS FROM SILICATES.

1,320,212. Specification of Letters Patent. Patented Oct. 28, 1919.

No Drawing. Application filed October 30, 1918. Serial No. 260,351.

*To all whom it may concern:*

Be it known that I, ROBERT S. EDWARDS, a citizen of the United States, and resident of Brookline, Massachusetts, have invented certain new and useful Improvements in Processes of Recovering Salts from Silicates, of which the following is a specification.

The subject matter of my present invention is the recovery of potassium compounds from silicates containing potassium in insoluble form. In previous applications for example Serial No. 255683 filed September 25th, 1918, I have set forth methods for such recovery and my present invention involves an ultimate reduction phase combining with my previous methods or other corresponding methods so as to effect a more complete reduction and recovery than has been heretofore attainable.

The difficulties of commercial extraction by almost any method increase as completeness of reduction and recovery is approached with corresponding increase in the expense so that for practical purposes complete reduction and recovery is not commercially possible, although it is obviously desirable to carry reduction and recovery to the farthest possible point consistent with cost.

I have discovered in the practice of my method that it is possible by combining a final reduction immediately and continuously with the reaction of the furnace to secure results which considerably increase recovery without adding any material expense at all. This combined or supplementary phase of my method consists in maintaining a continuous regenerative reaction in an equeous medium in which the reaction is self-induced and maintained by the continuous addition of the residue of the furnaced charge as it is discharged from the kiln.

The principle involved in my present improvement is that of a high temperature hydrative heating accompanied by a disintegrating mechanical agitation. The chemical changes of this ultimate or final step involved in my present invention are supplementary to and are in natural sequence to the antecedent changes of the furnace reaction as will appear from the preferred procedure which I will now explain.

In reducing, the silicates are fired, preferably in a rotary kiln, with sodium chlorid, and calcium hydroxid, the materials being previously ground together and being heated in the kiln to the fusion point of sodium chlorid. The reaction which takes place is the dehydration of the hydroxid leaving the calcium oxid, the sodium chlorid being broken up and combining with the silicates and forming soluble potassium chlorid, leaving a portion of the silicate as sodium silicate.

The resultant passing from the kiln consists therefore in a charge of high temperature, although not high enough to alter the calcium oxid as such. This charge is made up of the potassium chlorid, sodium silicate, some sodium chlorid and the calcium oxid and usually in the form of pellets or finely divided matter.

This product in discharging therefore has the lime of the original charge as a result of the heating or calcining in a dehydrated form. In order to carry on and complete as far as possible the recovery I effect a regenerative action in an aqueous medium by continuously feeding or discharging this charge fresh from the kiln in its sintered and glowing or red hot condition. As the pellets and finely divided matter strike the water they continuously add to the heat, both by their own physical temperature as well as by the heat of chemical reaction generated by the practically instantaneous rehydration of the calcium oxid.

Under the constant effects of the ebullition and chemical change in the hot seething and constantly agitated liquor or slurry the potassium chlorid formed in the kiln is put into solution and at the same time is augmented by newly liberated potassium chlorid produced by the presence of excess of sodium chlorid unemployed in the kiln and in the presence of the high temperature before described.

Instead of using hydrated lime I may use other calcareous material capable of decomposing to produce lime, such for example as oxid of lime or carbonate of lime. When such other calcareous material is used water or steam is introduced into the kiln.

What I claim is:

1. The process of extracting potassium salts in water soluble form from silicates containing potassium in insoluble form, which comprises heating to the fusion point of sodium chlorid a mixture of the silicate, sodium chlorid and a hydrated base, and in effecting a further reduction of the products of said heating by maintaining a continuous regenerative action in an aqueous medium by continuous addition of said product introduced while hot into said reaction.

2. The process of extracting potassium salts in water soluble form from silicates containing potassium in insoluble form, which comprises grinding together a mixture of the silicates and sodium chlorid, together with quick lime ground in water, heating the mixture to the fusion point of the sodium chlorid, and in effecting a further reduction of the products of said heating by maintaining a continuous regenerative reaction in an aqueous medium by continuous addition to said product introduced while hot to said reaction.

3. The process of extracting potassium salts in water soluble form from silicates containing potassium in insoluble form, which comprises heating to the fusion point of sodium chlorid a mixture of the silicate, sodium chlorid and a hydrated base, and in effecting a further reduction of the products of said heating by maintaining a continuous, self-induced, regenerative reaction in an aqueous medium by continuous addition of said product introduced while hot to said reaction.

4. The process of extracting potassium salts in water soluble form from silicates containing potassium in insoluble form, which comprises heating to the fusion point of sodium chlorid a mixture of the silicate, sodium chlorid and calcareous material capable of decomposing to produce lime in the presence of water or steam, and in effecting a further reduction of the products of said heating by maintaining a continuous regenerative reaction in an aqueous medium by continuous addition of said product introduced while hot into said reaction.

5. The process of extracting potassium salts in water soluble form from silicates containing potassium in insoluble form consisting in taking the product of a furnace treatment in which a mixture of the silicate, sodium chlorid and a calcareous material have been heated to the fusion point of sodium chlorid, said product containing free calcium oxid and uncombined sodium chlorid, and effecting a further reduction of the product of said heating by maintaining a continuous regenerative reaction in an aqueous medium by the continuous addition thereto of said products while hot.

In testimony whereof, I affix my signature.

ROBERT S. EDWARDS.

Copies of this patent may be obtained for five cents each, by addressing the "Commissioner of Patents, Washington, D. C."